United States Patent Office 3,427,489
Patented Feb. 11, 1969

3,427,489
COMPACT RADIATION DETECTOR WITH SUPERIMPOSED FILTER, PHOSPHOR, GLASS AND PHOTOSENSITIVE LAYERS
John M. Walsh III, Madison, N.J., assignor to Bull & Roberts Inc., New York, N.Y., a corporation of Delaware
Filed July 2, 1965, Ser. No. 469,210
U.S. Cl. 313—101                 2 Claims
Int. Cl. G01t 1/24; G01b 15/00; H05b 37/03

ABSTRACT OF THE DISCLOSURE

This invention relates to the art of radiation detectors and more particularly to a detector for sensing the intensity of ultra violet radiation of a predetermined frequency, said detector comprising superimposed layers of a light sensitive material, a glass window, a phosphorous layer and a filter in intimate contact with each other.

As conducive to an understanding of the invention, it is noted that ultra violet radiation has the property of rapidly destroying bacteria, viruses and other viable organisms.

The efficacy of the ultra violet radiation in destroying such organisms varies depending upon the particular frequency of the ultra violet spectrum that is predominant and upon the intensity of such radiation and it has been ascertained that a frequency of 2537 angstroms (hereinafter designated A.) is most effective in destroying bacteria and particularly coliform which is commonly derived from human and animal waste matter.

The ultra violet radiation is generally derived from conventional germicidal ultra violet lamps which project light upon the material to be sterilized. Such lamps generate radiation at a variety of wave lengths, illustratively, up to 5700 A., but only that portion at 2537 A. has maximum germicidal effectiveness as above noted.

In order that effective sterilization be achieved it is essential that both the frequency and the intensity of the radiation be monitored constantly.

It is accordingly among the objects of the invention to provide a radiation detector and associated circuitry that is relatively simple in construction and may be manufactured at relatively low cost and which will monitor the radiation from an ultra violet source and when the intensity of the radiation of a predetermined frequency drops below a desired level will cause a control circuit to be actuated.

According to the invention, these objects are accomplished by the arrangement and combination of elements hereinafter described and more particularly recited in the claims.

Figure 1:
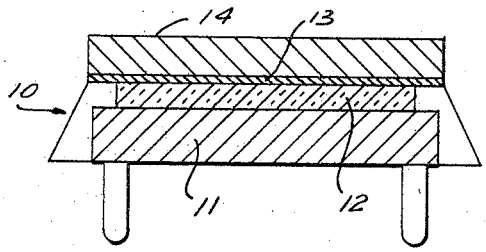
Figure 2:
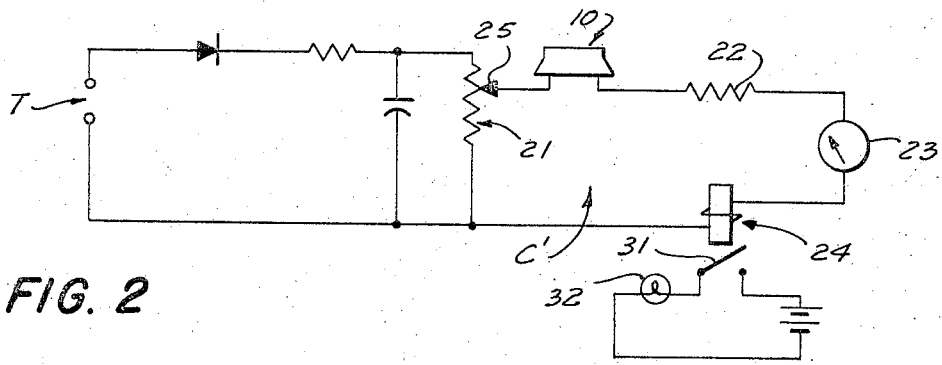
Figure 3:
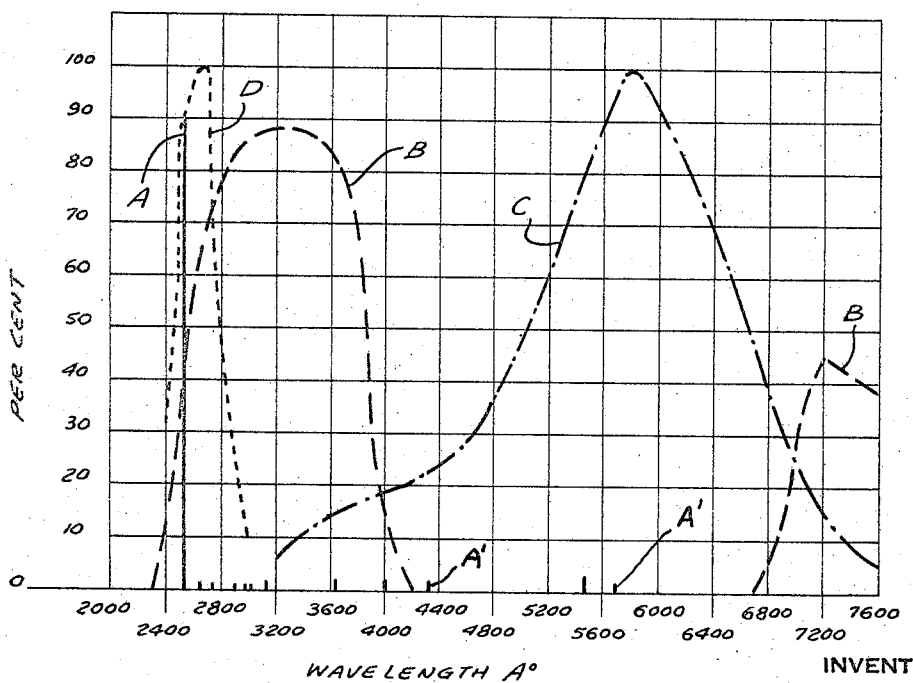

In the accompanying drawings in which are shown one of various possible embodiments of the several features of the invention, FIG. 1 is a diagrammatic sectional view of a radiation detector, FIG. 2 is a circuit diagram illustrating a system in which the radiation detector is incorporated, and FIG. 3 is a graph illustrating the operation of the device.

Referring now to the drawings, as shown in FIG. 1, the radiation detector 10 comprises a base formed from a light sensitive element 11 whose resistance varies with variation in the intensity of the light impinging thereon. In the illustrative embodiment shown, the light sensitive element 11 is an R.C.A. cadmium sulfide diode (Model 7163), the resistance of which decreases with increase in the intensity of the light thereon. The light sensitive element 11 is illustratively sensitive to visible radiation, having a wave length of 4000-7000 A.

The glass window 12 which is an integral part of the diode 11 is coated as at 13 with a phosphor which converts ultra violet radiation of 2537 A. to a visible radiation of 4000-7000 A. Preferably, the phosphor is of the type put out by Westinghouse under the trademark "Cool White" and is finely ground and dispersed in a slow-drying Lucite lacquer which is painted on the window 12. More particularly, the "Cool White" phosphor consists mainly of calcium phosphate with trace amounts of antimony, manganese, chloride and fluoride. This phosphor converts approxiamtely 85 percent of radiation at 2537 A. to visible radiation but does not convert any radiation at wave lengths of 2900 A. or higher to visible radiation. Thus, such phosphor will not be activated by radiation which is not substantially bactericidal. The lacquer base promotes even distribution of the phosphor and reduces phosphor deterioration which normally occurs on exposure to atmosphere.

A color filter 14 of conventional type such as the Corning Glass Co. Model 9863 blue filter which transmits radiation of 2400-4000 A., but absorbs visible radiation (between 4000 A. and 6800 A.) is positioned against the phosphor coating 13 to complete the assembly of the radiation detector 10.

In the operation of the system incorporating the radiation detector 10, the latter is positioned so as to be in the path of emission of the ultra violet radiation from the conventional ultra violet lamps used for sterilizing.

In the typical system for sterilizing liquids, for example, which flow through a closed tank, the ultra violet lamps would be located in the tank and the latter would have a window transparent to ultra violet radiation through which the radiation would project and the detector would be located immediately outside the tank close to said window.

The effectiveness of the ultra violet lamps in destroying harmful bacteria, for example, is a function of both the time and intensity of the exposure of the liquid to the ultra violet radiation. Thus, the time that the liquid is exposed may readily be regulated and it is the function of the radiation detection system, continuously to measure the intensity of the radiation. In the event the intensity drops below a predetermined amount due, for example, to aging of the ultra violet lamps, the detection system energizes a control circuit to provide a warning indication.

Thus, the filter 14 is selected to absorb all frequencies except those within the range of approximately 2400 to 4000 A.

The radiation of between 2400 and 4000 A. impinges on the phosphor which selectively converts the radiation having a frequency of 2537 A. to visible radiation of 4000 to 7000 A. which impinges on the light sensitive element 11.

As a result, the resistance of element 11 will be reduced.

Referring to FIG. 2, in the illustrative circuit shown incorporating the radiation detector 10, the potentiometer 21 will have a current flowing therethrough as a result of the rectified alternating current input voltage applied to terminals T.

The sensitivity of the control circuit C' which includes the detector 10, the resistor 22, the milliammeter 23 and the relay 24, is set by adjusting the movable arm 25 of the potentiometer 21. Thus, the arm 25 is set so that with a desired intensity of radiation of frequency of 2537 A. on the detector 10, from the ultra violet lamps, the resistance of the element 11 will be at a value such that the current flow through the control circuit C' will be sufficiently high to maintain relay 24 in energized condition. Thus, its contacts 31 will be open and the lamp 32 will not be illuminated.

In the event the intensity of the ultra violet lamp should drop, the resistance of the element 11 will increase with resultant decrease in current flow through the control circuit C'. As a result, when the current decreases below a predetermined amount which is inversely related to the drop in the radiation intensity, the relay contacts 31 will close to complete a circuit to the warning lamp 32.

The system above described is particularly designed to sense radiation of approximately 2537 A. Although germicidal ultra violet lamps generate radiation at a variety of wave lengths up to, say, 5700 A., only that portion at 2537 A. has maximum germicidal effectiveness.

This is clearly shown in the graph, FIG. 3, in which A is the radiation intensity and is maximum at 2537 A. and much less at various other wave lengths up to say 5700 A. as as A'. B is the radiation transmission of filter 14 and as shown in FIG. 3, the pass range of the filter used is substantially from 2400 to 4000 A. C is the sensitivity of element 11 and as shown in FIG. 3 its maximum sensitivity is from approximately 4000 to 7000 A. which is in the visible range. D is the bactericidal effectiveness of the radiation and it is maximum approximately at the radiation frequency of 2537 A.

Although 90% of the total radiation produced by the most efficient ultra violet lamps is at 2537 A., proper control cannot be maintained by measuring total radiation. This is due to the fact that as the lamp ages, the output at 2537 A. drops more rapidly than at other wavelengths and although the total intensity may only have dropped a small amount, the intensity of the effective frequency of 2537 A. will have dropped appreciably thereby impairing the effectiveness of the lamps for sterilization purposes.

Since the radiation detector above described selectively converts ultra violet radiation of 2537 A. to visible radiation due to the use of the phosphor coating above described, a simple yet highly efficient device is provided for monitoring decrease in the intensity of such specific frequency.

As many changes could be made in the above article and system, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A radiation detector comprising a light sensitive base of cadmium sulphide whose resistance varies with the intensity of light impinging thereon, a glass window secured to said base and in intimate contact therewith, a phosphor layer applied to said window in direct contact therewith and on the surface thereof opposed to said base, a color filter in intimate contact with said phosphor layer to permit passage of light rays having a predetermined frequency range depending upon the characteristics of the filter selected, said phosphor layer converting those rays impinging on the phosphor that are a predetermined portion of the frequency of the rays passing through the filter into visible light which will impinge upon the cadmium sulphide base to vary the resistance thereof depending upon the intensity of the rays impinging on the phosphor.

2. The detector set forth in claim 1 in which said phosphor layer is of the type which converts ultra violet radiation of 2537 A. to a visible radiation of 4000 to 7000 A. and said light sensitive base is sensitive to radiation having a wave length of 4000 to 7000 A.

References Cited

UNITED STATES PATENTS

| | | | |
|---|---|---|---|
| 2,114,163 | 4/1938 | Bird | 250—83.3 |
| 3,013,257 | 12/1961 | Ippolito | 315—129 |
| 3,247,413 | 4/1966 | Bisso et al. | 250—83.3 |

JAMES W. LAWRENCE, *Primary Examiner.*

R. C. DEMEO, *Assistant Examiner.*

U.S. Cl. X.R.

250—83.3; 315—129